United States Patent [19]

Woolsey

[11] Patent Number: 4,574,493
[45] Date of Patent: Mar. 11, 1986

[54] SYSTEM FOR MEASURING FLATNESS OF ROLLED ALUMINUM CONTAINER SHEET

[75] Inventor: Steven L. Woolsey, Newburgh, Ind.

[73] Assignee: Aluminum Company of America, Pittsburgh, Pa.

[21] Appl. No.: 691,408

[22] Filed: Jan. 14, 1985

[51] Int. Cl.[4] ............................ G01B 3/46; G01B 5/00
[52] U.S. Cl. ................................ 33/501; 33/168 R
[58] Field of Search ............... 33/168 R, 178 B, 493, 33/501

[56] References Cited

U.S. PATENT DOCUMENTS

| 146,974 | 2/1874 | Allen | 33/178 B |
| 703,208 | 6/1902 | Lawrence | 33/493 |
| 2,817,153 | 12/1957 | Jakubiak | 33/168 R |
| 3,513,556 | 5/1970 | Holland | 33/168 R |
| 3,740,779 | 6/1973 | Rubricuis | 33/178 B |

FOREIGN PATENT DOCUMENTS 355062  6/1922  Fed. Rep. of Germany .... 33/178 B

Primary Examiner—Richard R. Stearns
Attorney, Agent, or Firm—Andrew Alexander

[57] ABSTRACT

A system is provided for rapidly determining the flatness of a rolled sheet of aluminum which comprises placing a ruled lightweight flat bar across the sheet with portions of the bar in contact with adjacent high points on said sheet and measuring the distance between the high points. The height is then measured by inserting, between the bar and the lowest point on the sheet between the high points, a gauge having continuous measuring means comprising a conically shaped device tapering to a point. The gauge is inserted until both surfaces are in contact with the conical device. The thickness of the conical gauge is then measured at the point of contact to determine the distance between the surfaces.

7 Claims, 4 Drawing Figures

SYSTEM FOR MEASURING FLATNESS OF ROLLED ALUMINUM CONTAINER SHEET

BACKGROUND OF THE INVENTION

1. Background of the Invention

This invention relates to an inexpensive yet accurate measurement of flatness of aluminum sheet used in the manufacture of containers.

2. Background Art

In the manufacture of aluminum containers, such as aluminum beverage cans and ends therefor, it is necessary for the proper function of the end making apparatus to use flat sheet stock as the feed material. Since the sheet stock is produced in a rolling mill, a certain amount of curvature or buckling may be present. It is, therefore, necessary to measure the amount of such curvature or undulations to determine whether the maximum permissible buckles have been exceeded.

Such measurements may be made on a random sampling basis or, in some instances, on each sheet. In either instance, it is desirable that the measurement be made quickly and inexpensively, yet accurately.

Conventionally, this measurements is made by placing the sheet to be measured on a carefully machined flat surface and then placing a long straight edge across adjacent high points. The depth of the low point is then measured using a ruler or a step gauge.

However, it has been found that the weight of the straight edge may compress the sheet slightly, thus leading to inaccuracy in the measurement. Furthermore, measurement with a ruler, or even a step gauge, may be less than totally accurate as well as requiring additional amount of time, particularly if sufficient care is taken to provide some assurance of accuracy.

SUMMARY OF THE INVENTION

It is, therefore, an object of the invention to provide an inexpensive yet accurate system for rapidly measuring the flatness of an aluminum sheet.

It is another object of the invention to provide an inexpensive yet accurate system for rapidly measuring the flatness of an aluminum sheet using a straight edge placed between adjacent high points or apices on the sheet while minimizing the amount of distortion of the sheet during the measurement.

It is yet another object of the invention to provide an inexpensive yet accurate system for rapidly measuring the flatness of an aluminum sheet using a straight edge placed between adjacent high points on the sheet while minimizing the amount of distortion of the sheet during the measurement wherein the measuring device comprises a continuous measuring device which may be inserted between the low point on the sheet and the bottom edge of the straight edge.

These and other objects of the invention will be apparent from the following description and accompanying drawings.

In accordance with the invention, a system is provided for rapidly determining the flatness of a rolled sheet of aluminum which comprises placing a ruled light weight flat bar across the sheet with portions of the bar in contact with adjacent high points on said sheet and measuring the distance between the high points. The height is then measured by inserting, between the bar and the lowest point on the sheet between the high points, a gauge having continuous measuring means comprising a conically shaped device tapering to a point. The gauge is inserted until both surfaces are in contact with the conical device. The thickness of the conical gauge is then measured at the point of contact to determine the distance between the surfaces.

DESCRIPTION OF THE PREFERRED EMBODIMENT

Figure 1:
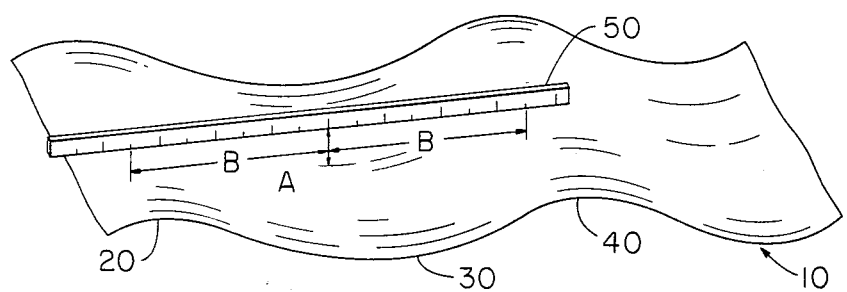
FIG. 1 is an isometric view of the sheet to be measured with the straight edge shown thereon.

Referring now to the drawings, and particularly to FIG. 1, an aluminum sheet 10 is shown having adjacent high points or apices 20 and 40 of a buckle with an intervening valley having a bottom or low point 30.

Figure 3:
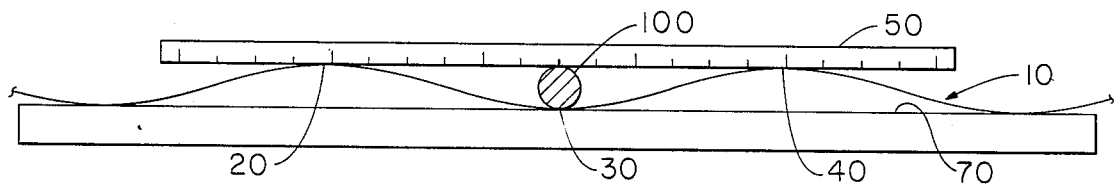
FIG. 3 is a side view in cross-section of the measurement system.

Sheet 10 is place on a table or flat surface 70, as shown in FIG. 3, which has been machined flat to aid in achieving accuracy in the height measurement.

A ruled straight edge 50 is placed on points 20 and 40 of sheet 10, and the distance B from apex point 20 to bottom point 30 is measured.

Figure 2:
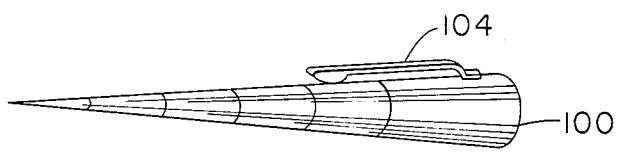
FIG. 2 is an isometric view of the gauge used with the straight edge shown in FIG. 1 to measure the sheet.
Figure 4:
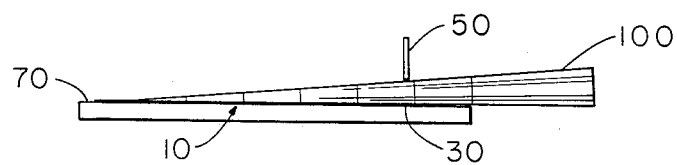
FIG. 4 is an end view in cross-section of the measurement system.

After measuring the horizontal distance between high point 20 and low point 30, the height A is determined using the conically shaped measuring gauge 100 shown in FIG. 2. The measurement is made, as shown in FIGS. 3 and 4, by inserting gauge 100 between straight edge 50 and bottom point 30 until contact is made by the opposite sides of gauge 100, respectively, with low point 30 and straight edge 50.

Gauge 100, as shown in FIG. 2, is a gradually tapered, generally conically shaped, gauge which may have graduations scribed on the surface. Gauge 100 may be fitted with a clip 104 if desired to retain it in a shirt pocket or the like when not in use. If gauge 100 is provided with graduations thereon, the height of the distance from the apex to the valley or low point of the sheet may be read directly from the gauge. Alternatively, the gauge may be marked at the point of contact with removable marking means and the thickness of the gauge at that point later determined with a micrometer.

Ruled straight edge 50 doubles as both a measurement rule for determining the one-half period of the cycle or half distance between adjacent high points and a straight edge to be used in conjunction with gauge 100 for height measurements. To provide accuracy in the height measurement, it is important that the weight of straight edge 50 be minimized so as to not distort the buckle of the sheet and thus distort the height measurement.

Therefore, in a preferred embodiment, straight edge 50 comprises a thin gauge metal strip of steel or aluminum stock having a backing of foamed polystyrene bonded thereto to provide lightweight stiffening to the thin metal. By thin gauge is meant a thickness of approximately 0.013 inch.

Using the measurement system of the invention, a more accurate determination of the flatness of a rolled aluminum sheeet can be readily determined due to the use of a lightweight straight edge in combination with the continuous increment measuring gauge.

Having thus described the invention, what is claimed is:

1. A system for rapidly determining the flatness of a rolled sheet of aluminum which comprises placing a ruled lightweight straight edge across the sheet with portions of said straight edge in contact with adjacent high points on said sheet; measuring the distance between said high points; inserting between said straight edge and the low point on said sheet between said high points, a gauge having continuous measuring means comprising a conically shaped device tapering to a point, with said gauge being inserted until both surfaces are in contact with the conical side of said gauge; and determining the thickness of said gauge at the point of contact to determine the distance between said surfaces.

2. The system of claim 1 wherein said straight edge comprises an aluminum sheet bonded to lightweight plastic material to reduce the weight of said straight edge to minimize distortion, by the weight of said straight edge, of the sheet being measured for flatness.

3. The system of claim 2 wherein said straight edge comprises aluminum sheet bonded to foamed polystyrene.

4. The system of claim 1 wherein said sheet to be measured is placed on a machined flat surface prior to measurement.

5. The system of claim 1 wherein said conically shaped measuring device comprises a metal rod having graduations inscribed thereon.

6. The system of claim 5 wherein clip means are provided adjacent the large end of said conical rod to aid in retention of said measuring rod when not in use.

7. The system of claim 1 wherein said conically shaped measuring device comprises a hollow tube of continuously tapered diameter, terminating in a point.

* * * * *